United States Patent [19]
Stigvils

[11] 3,735,245
[45] May 22, 1973

[54] PHASE SHIFTER CIRCUIT
[75] Inventor: Albert Charles Stigvils, Glendale Heights, Ill.
[73] Assignee: GTE Automatic Electric Laboratories Incorporated, Northlake, Ill.
[22] Filed: Dec. 20, 1971
[21] Appl. No.: 209,516

[52] U.S. Cl. ................................323/109, 323/122
[51] Int. Cl. ..............................................H03b 3/04
[58] Field of Search....................323/109, 110, 121, 323/122, 123, 124, 125; 328/155

[56] References Cited
UNITED STATES PATENTS
3,213,291 10/1965 Reid ................................323/123 X
2,125,127 7/1938 Roberts............................323/125 X
2,410,721 11/1946 Dome................................323/125 X FOREIGN PATENTS OR APPLICATIONS
961,003 4/1950 France ..............................323/109

Primary Examiner—A. D. Pellinen
Attorney—K. Mullerheim, B. C. Franz and T. C. Jay Jr.

[57] ABSTRACT

A phase shift circuit capable of shifting the phase of an input signal over a 360° range. It consists of a center tapped feed transformer with its outer terminals connected across the outer terminals of a potentiometer. The movable arm of the potentiometer is connected through a capacitor to one or the other of the outer terminals of the transformer, with the phase shifted output taken from the potentiometer arm and a center tap of the transformer.

1 Claim, 6 Drawing Figures

Patented May 22, 1973

3,735,245

INVENTOR
ALBERT CHARLES STIGVILS
BY Bernard E. Franz
ATTORNEY

PHASE SHIFTER CIRCUIT

BACKGROUND OF THE INVENTION

1. Field of the Invention

This invention relates to a circuit arrangement for shifting the phase of an input signal and more particularly to a circuit capable of shifting the signal over a 360° range.

2. Description of the Prior Art

The phase shifting of sine wave or other signals is a common requirement in electronic circuits and especially so in trouble shooting of malfunctioning circuitry and development work. However, when the required range is as much as 360° of phase shift, no simple circuit has been provided.

In both FIGS. 4 and 6 the solid waveform represents the REF terminal of the prior art circuits shown in FIGS. 1 and 2 respectively with the resistor requirements noted for an in phase condition. The dashed waveform indicates the direction in which the phase shift moves — with respect to the REF — and the resistor requirement is again noted to cause this 180° phase shift.

It is easily seen in FIG. 4 showing the waveforms obtainable with the circuit of FIG. 1 that when R is zero ohms that the output phase must be 180° out of phase with the REF. But when R is at maximum resistance, the $X_c$ value must be much lower than R MAX to cause an in phase condition. In fact to be absolutely in phase $X_c$ should be equal to zero ohms.

In FIG. 6 showing the waveform obtainable with the circuit of FIG. 2 it is also easily seen that when R is equal to zero ohms the output signal is exactly in phase with the REF. But when R is a maximum resistance, again the $X_c$ value must be much lower than R MAX to cause the 180° out of phase condition. In fact to be exactly out of phase by 180°, $X_c$ should be equal to zero ohms. In both instances it shows that it is desirable to have $X_c$ equal zero ohms when R is at maximum resistance.

SUMMARY OF THE INVENTION

Accordingly, it is an object of this invention to provide a novel phase shifting circuit capable of providing controlled phase shift over a range of 360°.

Another object of the present invention is to provide a phase shift circuit which is simple in construction and operatively efficient.

It is a feature of this circuit that a potentiometer is connected across the entire transformer output to permit the reduction of the $X_c$ reactance to zero.

DETAILED DESCRIPTION OF A PREFERRED EMBODIMENT

Figure 3:
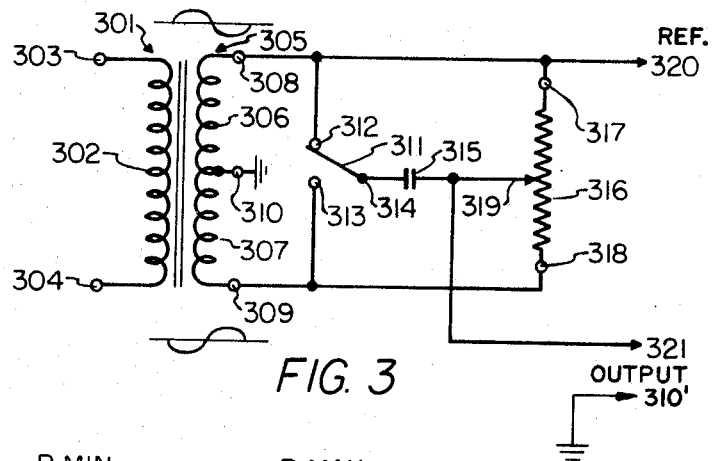
FIG. 3 is a simplified schematic circuit of the present invention.

The circuit as shown in FIG. 3 has an input transformer 301 with a primary winding 302 terminated by terminals 303 and 304, and a secondary winding 305 consisting of the two halves 306 and 307 connected together at the center tap 310, with end terminals 308 and 309 respectively. The center tap 310 is connected to ground potential. A transfer switch 311 has its terminals 312 and 313 connected to the transformer 305 and terminals 308 and 309 respectively. Also connected to these same transformer terminals 308 and 309 are the potentiometer 316 end terminals 317 and 318. A capacitor 315 has one terminal connected to the wiper arm terminal 319 of the potentiometer 316 and a second terminal to the transfer contact terminal 314 of switch 311.

The alternating current input is to terminals 303 and 304 of the transformer 301. The output at terminal 321 and ground at terminal 310' is compared with the common reference point 320 of the junction of terminals 308, 312 and 317 the common output point 321 is connected between the capacitor 315 and wiper arm terminal 319.

Figure 1:
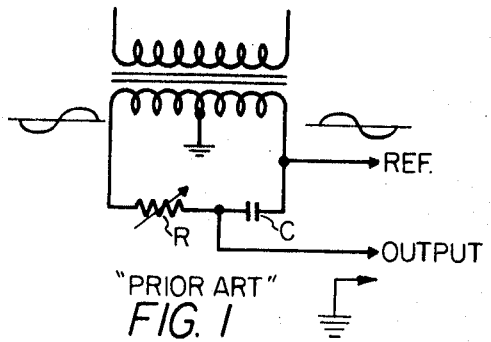
FIGS. 1 and 2 are simplified illustrations of two basic methods used in the prior art to obtain a shift in the phase of an electrical signal.

As the circuit is drawn in FIG. 3 it acts basically the same as the circuit shown in FIG. 1. With the wiper arm 319 of the potentiometer 316 positioned at the end 317 the capacitor is shorted and the output at terminal 321 is exactly in phase with the waveform at the reference terminal 320. This is equivalent to saying that the resistance R is a MAXimum and the reactance $X_c$ equals zero.

As the wiper arm 319 is moved towards terminal 318 the shunt resistance across the capacitor 315 increases, and when the shunt resistance is ten times larger than the reactance of the capacitor for the frequency used, the shunt resistance is effectively not in the circuit.

Then as the movement of the arm 319 is continued toward terminal 318, the resistance in this part of the arm decreases to zero where the output at 321 is exactly 180° out-of-phase with the waveform at the reference terminal 320. Thus, as seen, a full 180° phase shift range is traversed.

Figure 2:
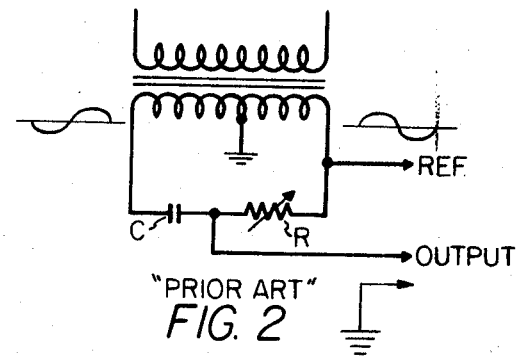

Then the wiper arm 319 is left in its last position, nearest terminal 318, and the switch 311 is operated transferring the transfer arm 315 from contact 312 to contact 313. No discontinuity will be seen in the output 321, since the contact 313 is directly connected to terminals 318 and 309. The operation of switch 311 effectively creates the equivalent circuit of the prior art circuit shown in FIG. 2. Now as the potentiometer arm 319 is moved back toward terminal 317 the exact same effect takes place as previously described, with the phase of the output signal shifted by another 180°.

Figure 4:
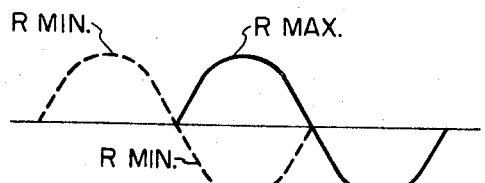
FIGS. 4, 5 and 6 show the waveforms and relative phase shifts under the conditions of the circuit applications.

At this point the action in the output wave shift can be explained as follows: if initially the circuit is as in FIG. 3 with the switch set with arm 314 in contact with 312 and the potentiometer arm 319 nearest terminal 317, the output signal is in phase with the reference terminal 320 as shown in FIG. 4 (R MAX).

Figure 5:
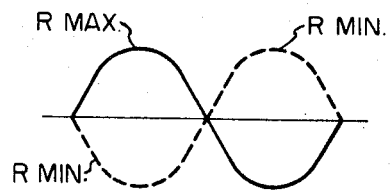

As the potentiometer arm 319 is moved toward terminal 318, the resistance decreases to zero ohms and the output wave shape is seen to move to the left of the reference by 180°. Only one cycle is shown thus for clarity, but at this point another half cycle of the output can be shown and nothing will be changed as seen in FIG. 5.

Figure 6:
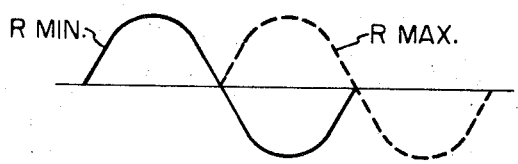

With the potentiometer arm 319 left at terminal 318 and the switch 311 operated to move terminal 314 into contact with contact 313 the waveform does not change, but the circuit has changed so the lobes noted on the waveforms must be changed and look like that of FIG. 6.

Now as the resistor potentiometer arm 319 is moved toward terminal 317 the resistance will decrease towards zero ohms which once again shifts the output trace as shown to the left by another 180°. The potentiometer arm 319 is now back to the initial starting point where the cycle was started and the output has shifted by 360°.

If the switch is mounted on the potentiometer to automatically change its state at either end of full rotation, a single control will continuously shift the output to any point over a full 360° range. To change the direction of the continuous phase shift would require that the two switched wires be interchanged.

Thus it can be seen that Applicant has created a circuit configuration that accomplishes two basic functions: that by connecting the resistor across the transformer a full 180° phase shift is possible because the arm can move directly to either leg of the transformer, rather than to the capacitive reactance terminal as in the prior art, and because of the resistor connected as mentioned above, a single switch — a single pole double throw — can be added and a full 360° phase shift is possible without any discontinuity in the output signal.

What is claimed is:

1. Phase shifting apparatus comprising: input terminal means and output terminal means, a transformer having a primary winding connected to said input terminals and a center tapped secondary winding having a first and second terminal and a center tap terminal, said center tap terminal connected to a neutral potential, a potentiometer having a pair of end terminals and a wiper arm terminal, said end terminals each connected to a terminal of said secondary winding, a transfer switch having a first and a second terminal connected respectively to said first and second terminals of said transformer secondary winding and a transfer terminal, a capacitor having a first terminal connected to said wiper arm terminal and a second terminal connected to said transfer terminal, said output terminal means connected to said wiper arm terminal and said transformer center tap.

* * * * *